(12) United States Patent
Puglia (10) Patent No.: US 6,930,631 B2
(45) Date of Patent: Aug. 16, 2005

(54) SENSOR FRONT-END WITH PHASE CODING CAPABILITY

(75) Inventor: Kenneth V. Puglia, Westford, MA (US)

(73) Assignee: M/A-Com, Inc., Lowell, MA (US)

( * ) Notice: Subject to any disclaimer, the term of this patent is extended or adjusted under 35 U.S.C. 154(b) by 808 days.

(21) Appl. No.: 09/996,652

(22) Filed: Nov. 28, 2001

(65) Prior Publication Data

US 2003/0100285 A1 May 29, 2003

(51) Int. Cl.$^7$ ............................................. G01S 13/93
(52) U.S. Cl. ........................ 342/70; 342/71; 342/72; 342/21; 342/109; 342/114; 342/132; 455/293; 455/295
(58) Field of Search ............................. 342/70–72, 21, 342/107, 109, 111, 112, 114–116, 127, 132, 134, 135, 145, 189, 192, 193, 195–197, 202, 205; 455/293, 295

(56) References Cited

U.S. PATENT DOCUMENTS

| | | | | |
|---|---|---|---|---|
| 4,034,373 A | * | 7/1977 | de Pierre et al. | 342/100 |
| 4,078,234 A | | 3/1978 | Fishbein et al. | 342/110 |
| 4,140,060 A | * | 2/1979 | Brenner | 102/214 |
| 4,176,351 A | * | 11/1979 | DeVita et al. | 342/111 |
| 4,308,473 A | * | 12/1981 | Carnes | 327/113 |
| 6,085,151 A | * | 7/2000 | Farmer et al. | 701/301 |
| 6,225,943 B1 | * | 5/2001 | Curley et al. | 342/137 |
| 2003/0100285 A1 | * | 5/2003 | Puglia | 455/293 |

FOREIGN PATENT DOCUMENTS

| | | | | |
|---|---|---|---|---|
| EP | 0 809 118 A1 | 11/1997 | | G01S/13/32 |
| EP | 0 940 690 A2 | 9/1999 | | G01S/13/56 |

OTHER PUBLICATIONS

"A 12 GHz Low Cost Earth Terminal for Direct TV Reception from Broadcast Satellites", Douville, R.J.; Microwave Symposium Digest, MTT–S International vol. 77, Issue 1, Jun. 1977 Ps:427–429.*

Patent Abstracts of Japan, Publication No. 01047985, Publication Date Feb. 22, 1989, Application Date Aug. 18, 1987.

Williams D A: "Millimetre Wave Radars for Automotive Applications" Microwave Symposium Digest, 1992., IEEE MTT–S International Albuquerque NM, USA Jun. 1–5, 1992, New York, NY USA, IEEE, US, (Jun. 1, 1992), pp. 721–724, XP010062944. ISBN: 0–7803–0611–2.

* cited by examiner

Primary Examiner—John B. Sotomayor (57) ABSTRACT

A sensor front end for an electronic radar sensor is disclosed that provides for a lower parts count while providing technical functionality by using multifunction parts, i.e., parts that are used both in transmitting and receiving. The sensor front end includes a continuous wave signal source that functions as a signal source when the front end is transmitting a signal and as a local oscillator when the front end is receiving a signal. The sensor front end also includes a tri-mode mixer that functions as a phase-modulator and transmit switch when the front end is transmitting a signal and as a mixer/down-converter when the front end is receiving a signal. The sensor front end further includes a common aperture antenna that acts as both a transmitting antenna for transmitting a sensor signal and for receiving a reflected signal from a object. A phase shifter can be added to provide a predetermined phase shift in the transmitted sensor signal, the received reflected signal, or both, such that in-phase and quadrature signal components are provided. In addition, phase coding may be added to the signal to reduce the degenerative impact of interfering signals. A receiver module is coupled to the tri-mode mixer such that, when receiving a reflected signal, the receiver provides a baseband sensor output signal that can be used to determined the position and velocity of the object. A sampling module can be added such that the sensor output signal is sampled and provided as an analog signal, or the sampled sensor output signal can be provided to an analog-to-digital converter to convert the sensor output signal into a digital format, or both.

12 Claims, 10 Drawing Sheets

SENSOR FRONT-END WITH PHASE CODING CAPABILITY

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

Proximity sensors of various types are used in a variety of applications in which the distance to an object and, in some circumstances, the closing velocity of that object are to be determined. This data is often provided to a processing system for analysis. Typically, this analysis determines whether one or both of the distance and velocity exceed a predetermined safety threshold and whether an alarm is to be set or other action taken. Proximity sensors are used, for example, in a variety of applications that can include burglar alarms, obstacle detection, and automobiles. Proximity sensors in automobiles are used to determine the relative position and closing velocity of other automobiles or objects in the vicinity of the automobile. These sensors must be physically small, light weight, highly reliable, and low cost. The requirements of the systems that utilize these sensors are often quite stringent both in terms of performance and in the physical and economic factors as well. The more complex the sensor, the larger the parts count, and concomitantly, the higher the cost, the higher the mass, the larger the physical volume of the sensor and the lower the reliability of the sensor.

Therefore, it would be desirable to provide a sensor that utilizes fewer components to reduce the cost, size, and weight of the sensor and provide the necessary functionality and reliability.

BRIEF SUMMARY OF THE INVENTION

A sensor front end for an electronic sensor is disclosed that provides for a lower parts count while providing technical functionality by using multi-mode parts, i.e., parts that are used both in transmitting and receiving. The sensor front end includes a continuous wave signal source that functions as a signal source when the front end is transmitting a signal and as a local oscillator when the front end is receiving a signal. The sensor front end also includes a tri-mode mixer that functions as a phase-modulator when the front end is transmitting a signal and as a mixer/down-converter when the front end is receiving a signal. The sensor front end further includes an antenna that acts as both a transmitting antenna for transmitting a sensor signal and for receiving a reflected signal from a object. A phase shifter can be added to provide a predetermined phase shift in the transmitted sensor signal, the received reflected signal, or both, such that in-phase and quadrature signal components are provided for. A receiver module is coupled to the tri-mode mixer such that, when receiving a reflected signal, the receiver provides a baseband sensor output signal that can be used to determine the position and velocity of the object. A sampling module can be added such that the sensor output signal is sampled and provided as an analog signal, or the sampled sensor output signal can be provided to an analog-to-digital converter to convert the sensor output signal into a digital format, or both.

In particular, a sensor front end is disclosed that includes an antenna having an antenna port and a common aperture for transmitting a sensor signal and receiving a reflected signal. A continuous wave signal source is coupled to a first input of a tri-mode mixer that provides a predetermined amount of signal between the first input and a first input/output port. The signal provided from the first input port to the first input/output port is pulse and phase-modulated by a phase-modulation signal provided to a second input/output port of the tri-mode mixer by a phase-modulator. The phase-modulated signal exits the tri-mode mixer at the first input/output port and is provided to the antenna port for transmission therefrom as the sensor signal. If a object is within the beam width of the antenna, a portion of the sensor signal is reflected back to the antenna aperture as the reflected signal and is coupled to the first input/output port of the tri-mode mixer. The continuous wave signal source coupled to the first input acts as a local oscillator and the tri-mode mixer mixes the local oscillator and the received reflected signal and provides a baseband video output signal from the second input/output port. A transmit-receive switch is used to switch the second input/output port between the phase-modulator and a receiver-processor. The receiver processor includes a phase-demodulator that demodulates the baseband video-output signal and provides the demodulated baseband video-output signal as a sensor output signal.

Other forms, features and aspects of the above-described methods and systems are described in the detailed description that follows.

BRIEF DESCRIPTION OF THE SEVERAL VIEWS OF THE DRAWING

The invention will be more fully understood by reference to the following Detailed Description of the Invention in conjunction with the Drawing of which.

DETAILED DESCRIPTION OF THE INVENTION

Figure 1:
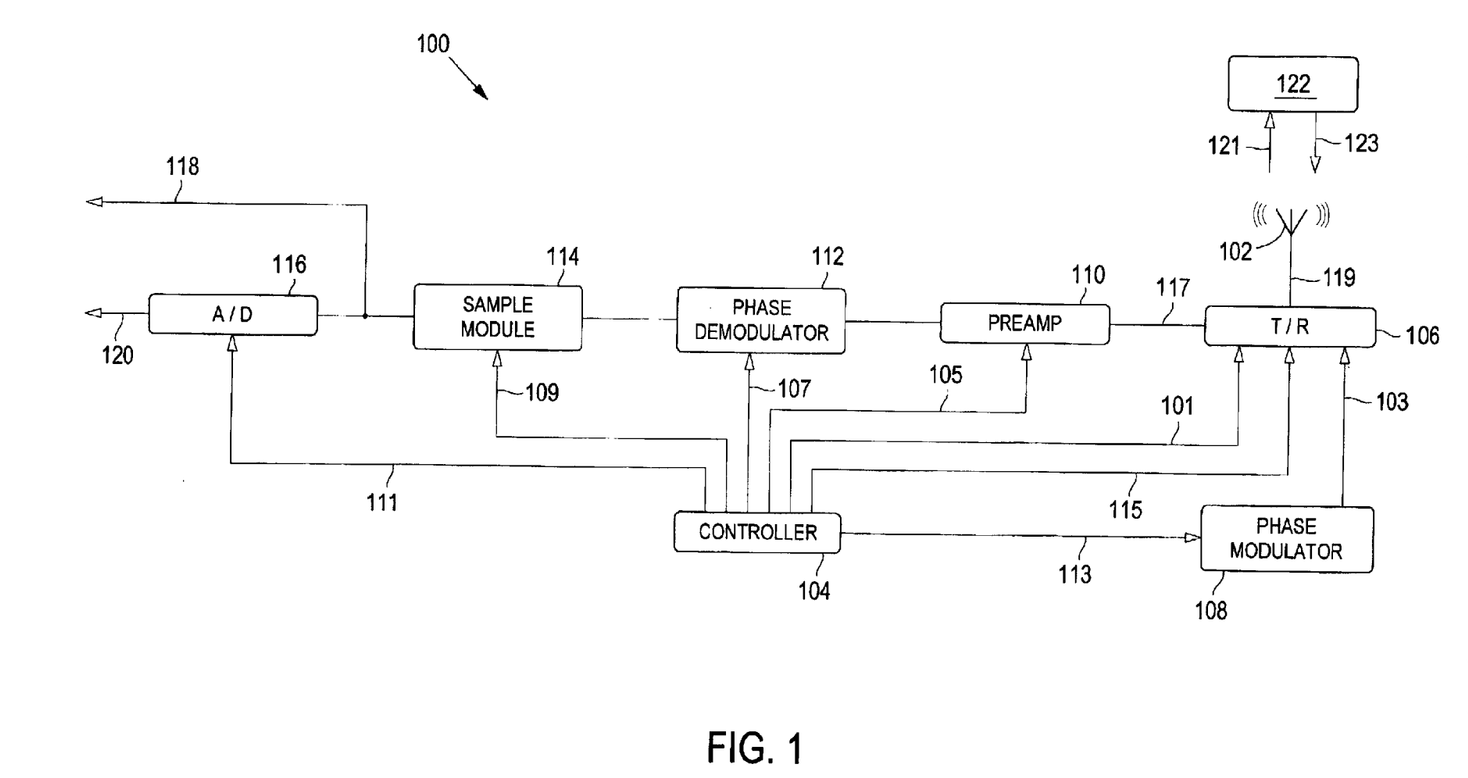
FIG. 1 is a block diagram of one embodiment of a sensor front end consistent with the present invention.

FIG. 1 depicts a block diagram of the architecture of a sensor front end consistent with the present invention. FIGS.

2 and 3 depict the transmitter functions including a phase-modulator and the receiver functions including phase code demodulator respectively. FIGS. 4–9 depict circuits suitable for use in the sensor front depicted in FIGS. 1–3, and FIG. 10 depicts another embodiment of the sensor front end. Although the following embodiments are described with respect to microwave frequencies and components, the apparatus and methods described herein may be applied to other frequencies and systems.

As depicted in FIG. 1, a controller 104 provides a plurality of control signals to ensure the proper timing and operation of the various components in the sensor front end 100. The sensor front end 100 includes a transceiver 106 that can simultaneously transmit a phase-modulated sensor signal 121 from an antenna 102 and coherently receive a reflected signal 123 and down convert this signal for further processing as a baseband video-signal.

In particular, the transceiver 106 receives two control signals from the controller 104. A first control signal is a transmit-receive control signal 101 that determines the routing of signals within the transceiver 106. A second control signal is provided to the transceiver 106 as an I/Q signal 115 which determines if the sensor signal is an "in-phase" or "quadrature phase" signal. The controller determines if the signal is to be a quadrature signal and if so, the controller will provide the I/Q signal 115 to a phase shifter(not shown in FIG. 1) to phase shift one or both of the transmitted and received signals. Transceiver 106 also receives a phase-modulation signal 121 from phase-modulator 108. Phase-modulator 108 receives a phase-modulator control signal 113 from the controller 104 and is responsive to the phase-modulator control signal 113 by selecting one of a plurality of predetermined signal phase states. In the illustrative embodiment two signal states are employed. The phase-modulator 108 provides the phase-modulation signal 103 that corresponds to the phase-modulation control signal 113 to the transceiver 106. Transceiver 106 phase-modulates the transmitter signal using the phase-modulation signal 103.

The phase-modulated transmitter signal is provided to the phase shifter 108 and if the transmitter signal is a quadrature signal, the transmitter signal is phase shifted by the phase shifter 108. This phase-modulated, and possibly phase shifted, transmitter signal is provided to the antenna port and radiated from the common aperture of the antenna 102 as sensor signal 121. If an object 122 is present within the beam width of the antenna 102, the object 122 reflects the sensor signal 121 and the antenna captures a portion of the reflected signal 123 in the common aperture. The captured portion of the reflected signal 123 is provided to the transceiver 106, via line 119, for down-conversion and further processing.

Transceiver 106 receives the captured portion of the reflected signal 123 via antenna 102 and line 119 and provides, as an output, a baseband video output signal 117. The baseband video output signal 117 is the down-converted video signal and representative of the amplitude and phase of the captured portion of the reflected signal 123. The down-converted baseband video signal 117 is provided to a pre-amp 110 coupled to the transceiver 106. The preamplifier 110 provides, as an output, an amplified signal that is a function of the broadband video signal output 117 received from transceiver 106. Preamplifier 110, in one embodiment, is also coupled to controller 104 and receives a sensitivity time control (STC) signal therefrom. The STC signal is a gain control signal to reduce a receiver gain setting for nearby objects or objects to prevent the receiver from saturating from the reflected signals from a nearby object.

The output of pre-amp 110 is provided to the input of phase-demodulator 112. The phase-demodulator 112 also receives a phase-demodulation signal 107 from the controller 104 and is responsive to the phase-demodulator signal by applying a phase-demodulator scheme to the preamplified baseband video-signal that is the converse of the phase-modulation scheme selected by phase-modulator 108. The phase-demodulator 112 provides, as an output, a phase-demodulated signal.

A sample and hold module 114 is coupled to the phase-demodulator 112 and to the controller 104. The sample and hold module receives a sample and hold signal 109 from the controller 104 and is responsive to the sample signal 109 by sampling the phase-demodulated output signal. The sample and hold module 114 provides this sampled signal as an analog sensor output signal 118. The sampled signal may also be coupled to an analog-to-digital converter 116 that provides a digitized output 120 of the sensor outputs 118 for digital storage and analysis.

Figure 2:
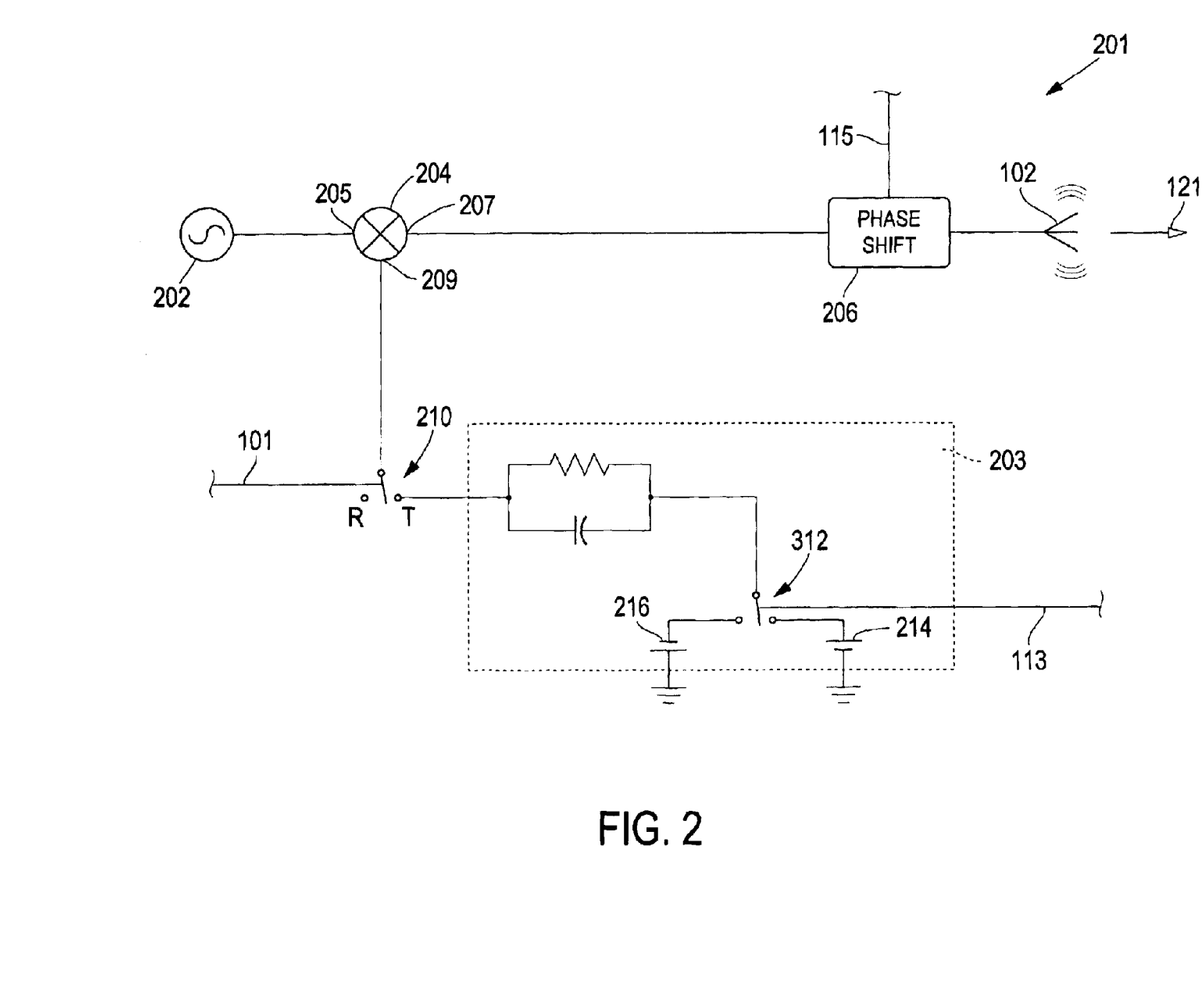
FIG. 2 is a block diagram of the transmitter and phase code modulator of the sensor front end depicted in FIG. 1.

FIG. 2 depicts the transmitter and phase-modulator portion of the sensor front end 100 depicted in FIG. 1. In particular, FIG. 2 depicts the microwave components 201 and the transmit and phase-modulator components 203. The microwave wave components 201 include a continuous wave (CW) signal oscillator 202 that provides a transceiver signal having a first frequency, a first amplitude, and a first phase. As discussed above, the transceiver signal is used during transmission, when it is the signal that will be modulated and radiated from the antenna 102 as the sensor signal 121. In addition, the transceiver signal is also used when receiving a captured portion of the reflected signal 123 as the local oscillator signal in the tri-mode mixer that is used to down-convert the captured portion of the reflected signal 123. The (CW) signal oscillator 202 can be any active element consistent with the desired operating frequency. Typically for a desired operating frequency through X-Band, a bipolar junction transistor is appropriate, and for desired frequencies through W-band, field effect transistors or GUNN devices are appropriate. A high Q resonator (not shown) may be added to provide increased frequency stability.

Mixers in general are used in transmitters as up-converters and phase-modulators and in receivers as down-converters. Typically a mixer will have two inputs, one receiving the local oscillator signal and the other receiving the signal to be down-converted. In the sensor front end disclosed herein, the tri-mode mixer 204 functions not only as a mixer in the receiver mode, but will also function as a transmit pulse modulator and phase-modulator in the transmit mode. This tri-mode operation allows the sensor front end to reduce the parts count of the front end by using some of the components both while transmitting and while receiving.

The tri-mode mixer 204 receives the transceiver signal from the CW signal oscillator 202 at the first input port 205. The first input/output port 207 of the tri-mode mixer 204 is used to provide the phase-modulated transceiver signal to a phase shifter 206 during transmitter operation, or to receive the captured portion of the reflected signal 123 from the phase shifter 206 during receiver operation.

The signal that is to be transmitted from the antenna 102 as the sensor signal 121, is provided by the tri-mode mixer 204. The tri-mode mixer 204 passes a signal pulse having sufficient amplitude between the first input port 205 and the first input/output port 207 such that the portion of the transceiver signal provided therethrough is provided as an output from the first input/output port 207. The amount of the signal provided must be sufficient such that the portion of the transceiver signal switched from the tri-mode mixer 204 to the phase shifter 206 and transmitted from antenna 102 is sufficient to detect objects according to the desired system specifications. The amount of power required is typically a function of the specified detection range, the radar cross-section of the specified object, the gain of the antenna, and the sensitivity of the receiver. In addition, when transmitting, the tri-mode mixer operates as a phase-modulator and will adjust the phase state of the transceiver signal in response to the phase-modulation signals 115 received at a second input/output 209 from the phase-modulator 203.

In the embodiment depicted in FIG. 2, the phase-modulator 203 employs a bi-phased shift keyed "BPSK" phase-modulation scheme, wherein the BPSK phase-modulation scheme includes two phase states representative of a zero "0" and a one "1", which in the illustrated embodiment are either in phase, i.e. 0 degrees out of phase with one another, or out of phase, i.e. 180 degrees out of phase with one another respectively. The phase-modulator 203 provides one of these two phase states to the balanced mixer input/output 204. The particular choice of the two bi-phase components is selected via switch 212 that is controlled by signal 113 from controller 104. In the illustrated embodiment, the two phase states are created by the reverse polarity of the voltage sources 214 and 216 and applying one of the two opposing polarities to the second input/output port 209 of the tri-mode mixer 204.

The switch 210 provides for the switching of the transceiver transit/receive function under control of transmit-receive signal 101 received from the controller 104. Thus, when the switch 210 is in the transmit, "T", position, phase-modulator 203, responsive to the phase-modulation control signal 113, provides the phase-modulation signal 103 to the second input/output 209 of the tri-mode mixer 204. The phase modulation signal is applied to the transceiver signal and is reflected in the phase of the transceiver signal provided, as an output, from the first input/output 207 of the tri-mode mixer 204.

As discussed above, in a preferred embodiment the transceiver can be operated in an in-phase/quadrature phase-mode ("I/Q mode"). In this embodiment, phase shifter 206, in response to the I/Q signal 115, shifts the phase of the phase-modulated transceiver signal by a predetermined number of degrees prior to transmission from the antenna 102. In a preferred embodiment, the transceiver signal is shifted by 45 degrees prior to transmission by the antenna 102. I/Q mode is particularly advantageous for detecting stationary objects, or objects that maintain a constant distance from the antenna, by using two signals that are 90 degrees out of phase with one another, i.e., the two signals are orthogonal to one another. Each of the two orthogonal signals represent position vectors in an orthogonal vector space and the vector that results from the addition of these two signal vectors represents a position vector to the object for the time period of the two measurements.

Figure 3:
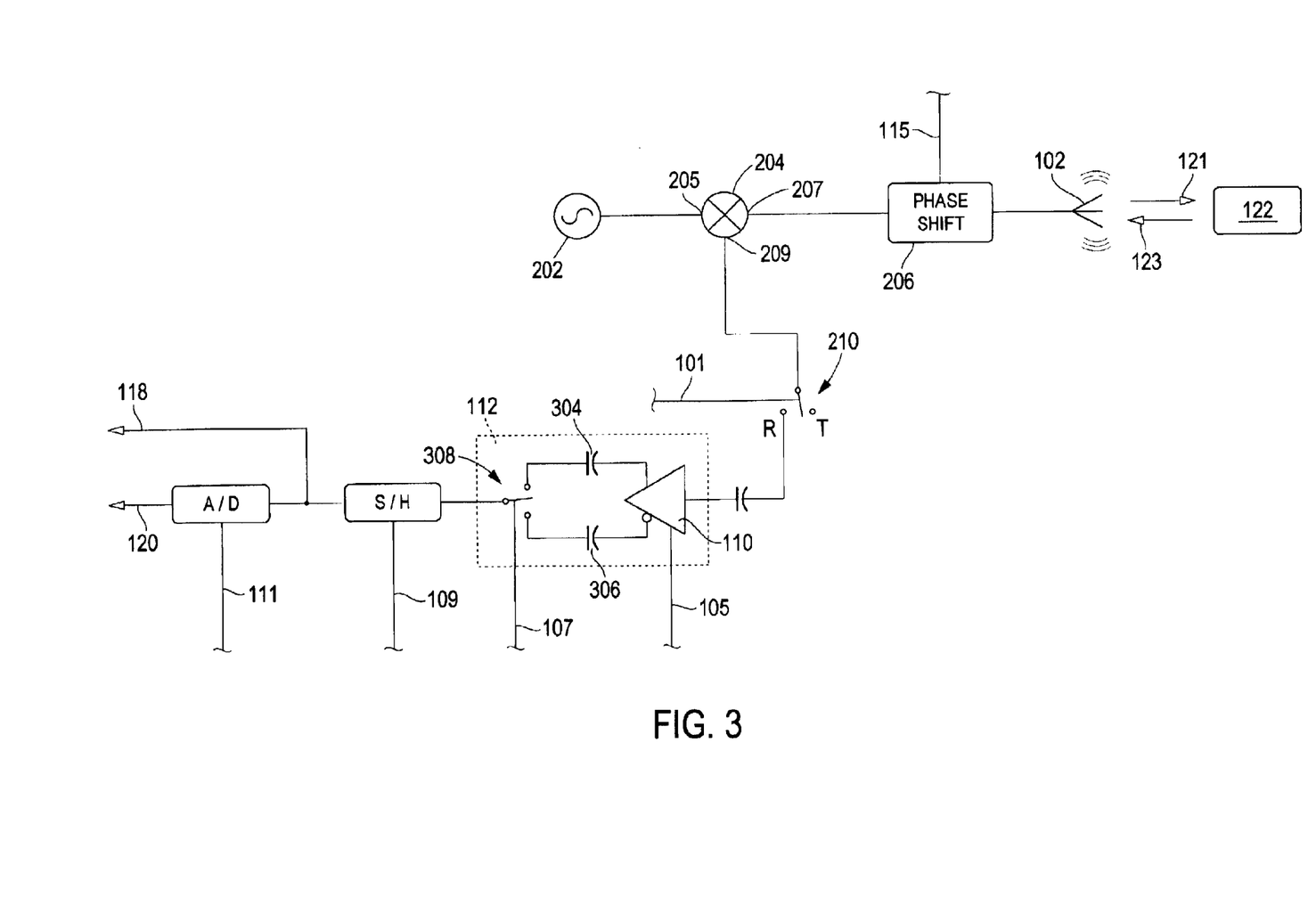
FIG. 3 is a block diagram of the receiver and phase code demodulator of the sensor front end depicted in FIG. 1.

FIG. 3 depicts a transceiver 106 when switch 210 is in the receiver, or "R" position. In particular FIG. 3 illustrates the microwave devices 201 which include the CW signal source 202, the tri-mode mixer 204, the phase shifter 206 and antenna 102 receiving reflected energy 123. A portion of the reflected signal energy 123 is captured by antenna 102 and is provided to phase shifter 206. As discussed above, when the sensor front end 100 is to be operated in an I/Q mode, the phase shifter 206 provides a 45 degree phase shift prior to transmission from antenna 102. When operating in the I/Q mode the phase controller 206 shifts the captured portion of the reflected signal 123 by a predetermined amount, which typically is 45 degrees. In this way, the received signals are 90 degrees out of phase, i.e., are in quadrature. In one embodiment in which multiple pulses are used for each signal, there is no overlap between the I & Q pulses such that a predetermined number of in-phase pulses are transmitted followed by a predetermined number of quadrature pulses. If the sensor front end is not operating in I/Q mode, the phase shifter 206 passes the received reflected signal to the first input/output port 207 of the tri-mode mixer 204.

The captured portion of the reflected signal 123 provided at the first input/output port 207 is combined with the transceiver signal from the CW signal oscillator provided at the first input 205, as the local oscillator signal, in the tri-mode mixer 204 and down-converted signal to a baseband signal. The output of the mixer 204, i.e., the baseband video signal is provided at the second input/output port 209. In the illustrated embodiment the baseband video signal is derived from a BPSK phase-modulated signal and the mixing in tri-mode mixer 204 is coherent in nature thus, the baseband video signal will also be bi-polar, i.e., the baseband video signal will have both positive and negative voltages. The baseband video signal is connected by the transmit-receive switch 210, in the R position, to preamplifier 110.

The preamplifier 110 receives the baseband video signal and may also receive the STC command signal 105. As discussed above, the STC command signal is used to adjust the gain of the preamplifier 110 to avoid receiver saturation that may be caused by nearby objects. The preamplified baseband video signal is provided to the phase-demodulator 112 that includes capacitor 304 and 306 and phase-demodulator switch 308. Phase-demodulator switch 308 is responsive to the phase-demodulation control signal on line 107 provided by controller 104 and is used to provide the necessary phase-demodulation to the baseband video signal. Switch 308 switches substantially synchronously with switch 212 (FIG. 2) in order to provide a demodulation scheme that is substantially synchronous with the modulating signal. In the illustrated embodiment in which BPSK phase-modulation is used one output of the preamplifier 110 is an inverting output and the other output is a non-inverting output. The proper phase-demodulation of the preamplified baseband video signal will therefore convert the bipolar baseband video signal into a unipolar signal. The output of the demodulator 112 is provided to the sample module 114, which is responsive to the sample signal 109 provided by controller 104 by sampling the phase-demodulated signal. The sampled signal is provided as a sensor output 118, or as an input to an analog to digital converter 116, or both. The analog to digital converter 116 is responsive to the a/d convert signal 111 by providing as an output a digital representation 120 of the sampled phase-demodulated signal.

Figure 4:
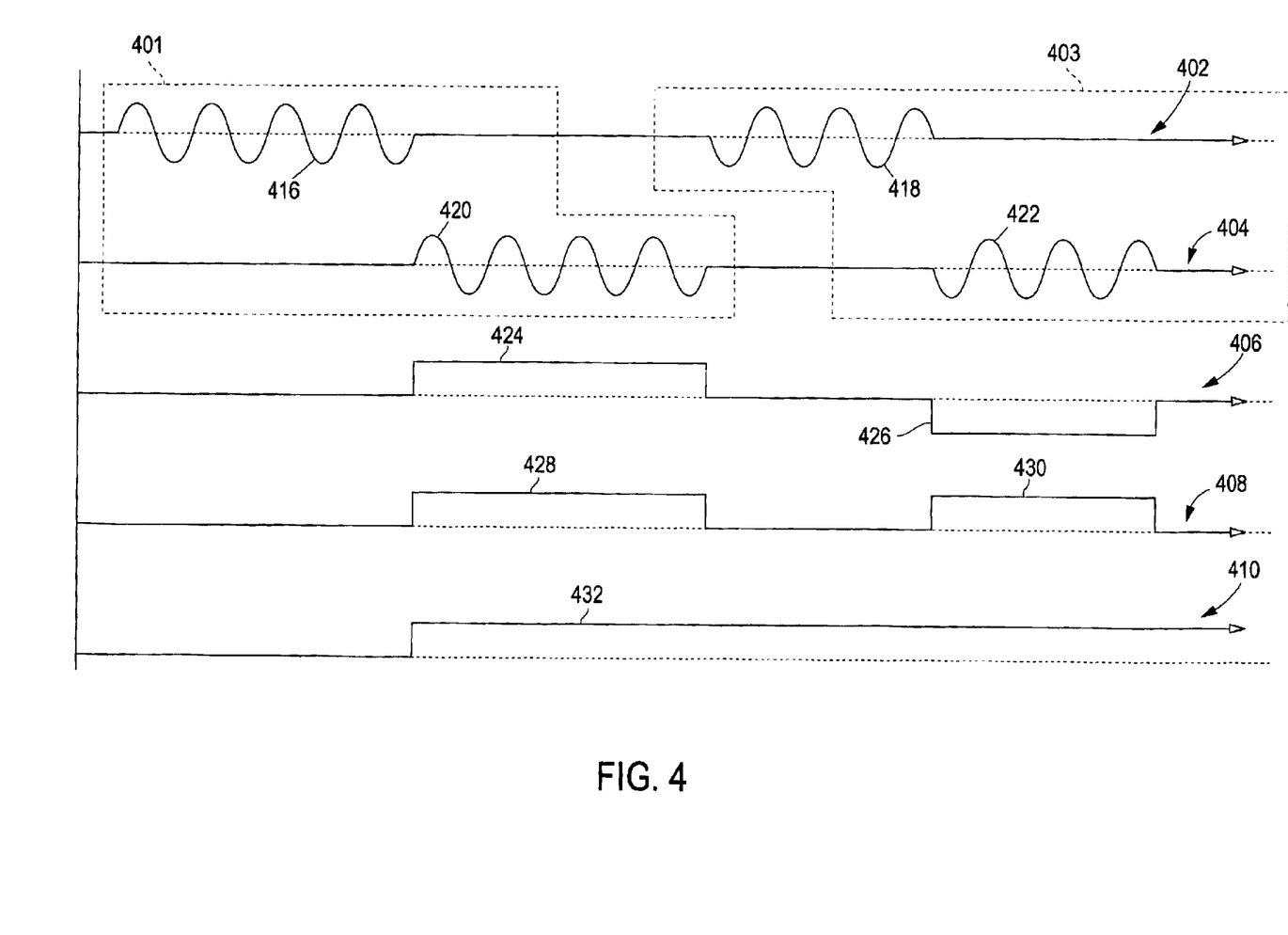
FIG. 4 is a plurality of graphs illustrating the operation of the sensor front end depicted in FIG. 1.

FIG. 4 depicts a series of graphs that illustrate the operation of the sensor front end depicted in FIG. 1 during two consecutive transmit and receive cycles 401 and 403 respectively. Graph 402 depicts the sensor transmit signal 121, graph 404 depicts the received reflected signal 123, graph 406 depicts the baseband video signal, graph 408 depicts the phase-demodulated video signal, and graph 410 depicts the sampled output signal. In particular, the first transmitted sensor signal pulse 416 is arbitrarily defined as a "1" state and the second sensor signal pulse 418, which is 180 degrees out of phase with the first pulse 416, is arbitrarily defined as a "0" as depicted in graph 402. The first and second received reflected signal pulses 420 and 422 correspond to the first and second transmitted pulses 416 and 418 respectively, and are attenuated and time delayed versions thereof as depicted in graph 404. The down-converted baseband video pulses 424 and 426 corresponding to the first and second receive pulses are bipolar in nature as discussed above and depicted in graph 406. The down-converted baseband video signals are bi-phase due to the operation of the tri-mode mixer in mixing the received reflected signals with the CW signal source coherently. In the illustrated embodiment, the baseband video output signals are proportional to the relative phase of the received signals compared with the coherent signals provided by the CW signal source used in the tri-mode mixer, and to the strength of the captured portion of the reflected signals. The bi-phase baseband video signals are converted to uni-phase signals using the known phase code by the demodulator as depicted in graph 408. Finally, the sampled output 432 is provided as depicted in graph 410.

Figure 5A:
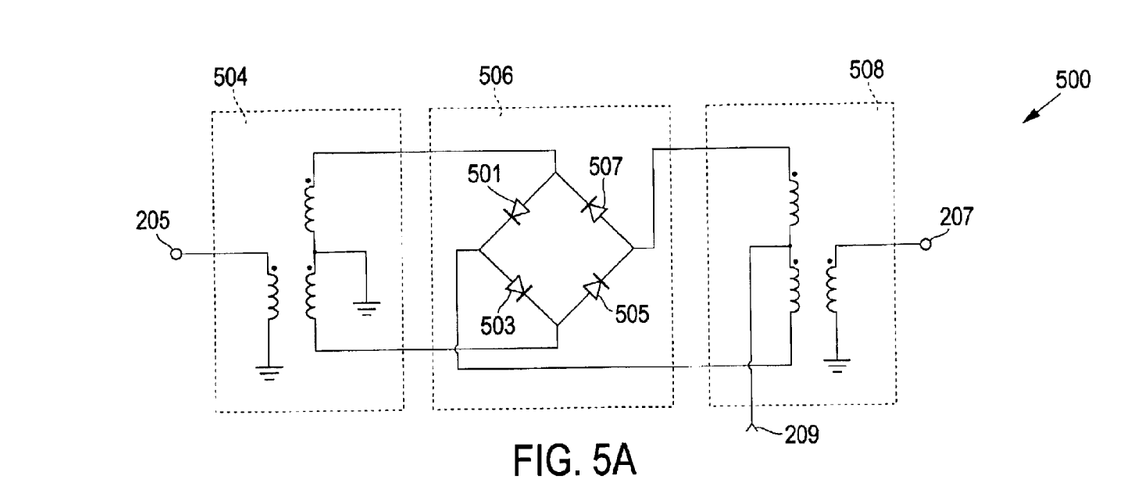
FIGS. 5A and 5B illustrate two embodiments of a tri-mode mixer suitable for use in the sensor front end depicted in FIG. 1.
Figure 5B:
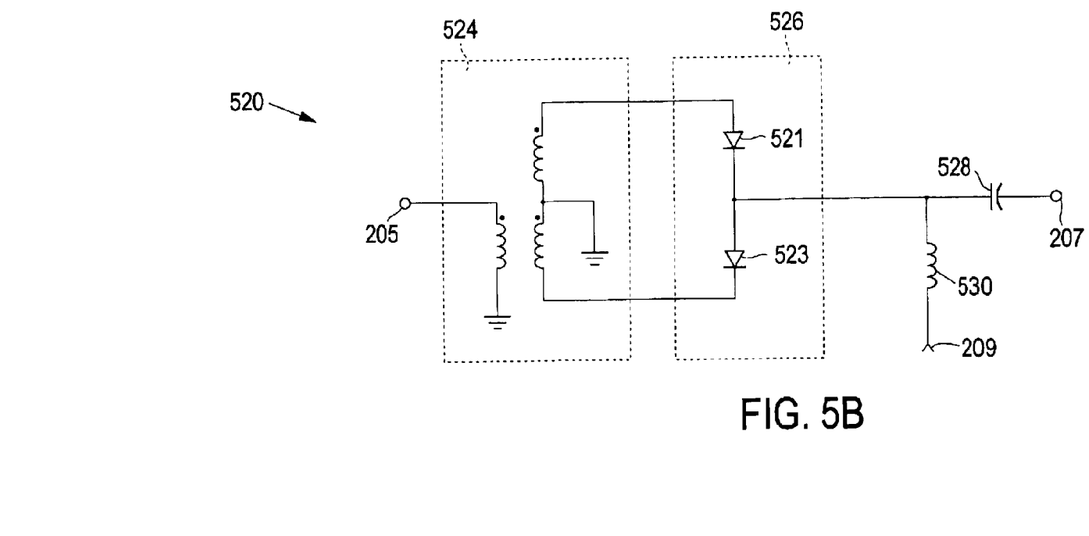

FIGS. 5A and 5B depict two embodiments of tri-mode mixers that are suitable for use in the sensor front end 100 depicted in FIG. 1. FIG. 5A is a double balanced mixer ("DBM") 500 that includes first and second baluns 504 and 508 respectively and a quad diode ring 506. In particular, the first balun 504 is coupled to the first input 205, which is the local oscillator "L" input. The balun 504 splits the input signal and provides a symmetric signal to the quad diode ring 506. In this embodiment of the tri-mode mixer, the diodes 501, 503, 505, and 507 can be thought of as switches, and in particular pairs of switches that are used to reverse the polarity of the signal applied to the second balun 508. Diodes 507 and 503 form a first diode switching pair and diodes 501 and 505 form a second diode switching pair.

When operating as a transmitter, the two pairs of diode switches are turned on and off by applying a positive or negative current to the second input/output port 209. A positive current provided to the second input/output port 209 will turn on diodes 507 and 503 and turn off diodes 501 and 505. Similarly, a negative current applied to the second input/output port will turn on diodes 501 and 505 and turn off diodes 503 and 507. In this way, the phase of the signal transmitted from the L input, i.e., the first input 205 to the R input, or the first input/output port 207 can be affected.

When operating as a receiver, the pairs of diode switches are turned on and off by the signal provided at the first input 205, i.e., the L input of the tri-mode mixer. For a positive going signal, diodes 503 and 507 are turned on and diodes 501 and 505 are turned off. For a negative going signal at the first input 205, diodes 501 and 505 are turned on and diodes 503 and 507 are turned off. As can be seen this will have the effect of reversing the polarity of the output balun 508, effectively multiplying the signal input from the first input/output port by a series of pulses at the first frequency, effectively mixing the two signals together.

FIG. 5B depicts another embodiment of a tri-mode mixer suitable for use in the sensor front end depicted in FIG. 1. Mixer 520 is a single balanced mixer. The single balanced mixer 520 has intrinsic isolation between the first input port 205 and the first input/output port 207 by the null associated with the bipolar drive signal, from balun 524, across diodes 521 and 523. Inductor 530 is provided to prevent RF energy from the first input/output port 207 from entering the second input/output port 209. Capacitor 528 is added to prevent the down-converted baseband video signal from leaking through the first input/output port 209.

When operated as a phase-modulator when transmitting the sensor signal, positive and negative current input to the second input/output port 209 will switch diodes 521 and 523 on and off accordingly. This will have the effect of reversing the phase of the signal leaking through the mixer from the first input port 205 to the first input/output port 207.

When operated as a mixer when down-converting the received reflected signal, as the signal from the first input port 205 changes, diodes 521 and 523 will be biased on and off accordingly. In this way, the signal from the first input port 205 is mixed with the received signal input from the first input/output port 207 in either diode 521 or 523.

Figure 6A:
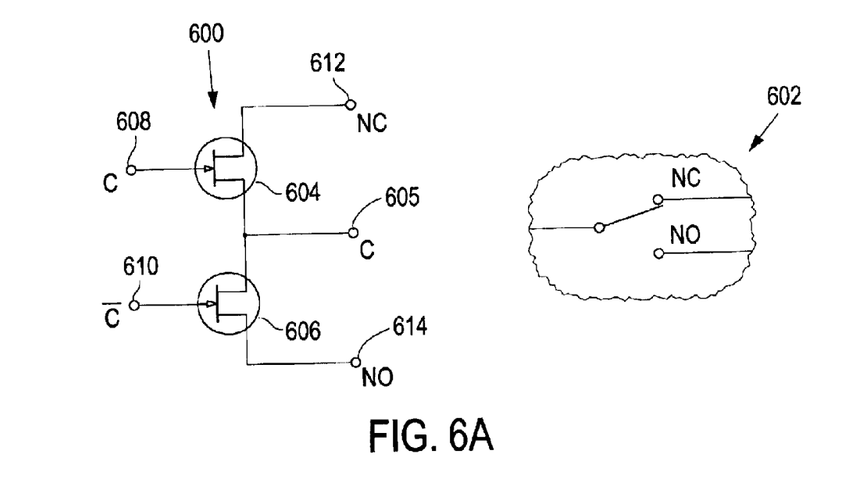
FIG. 6A illustrates one embodiment of a single pole double throw switch suitable for use in the sensor front end depicted in FIG. 1.
Figure 6B:
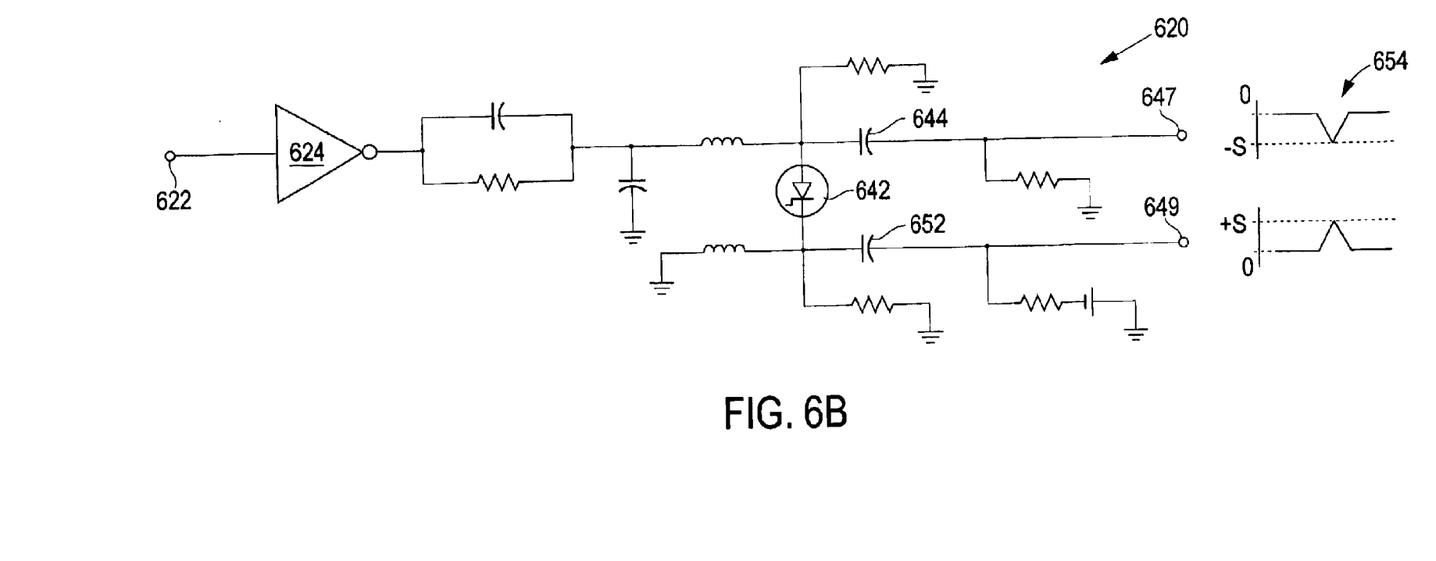
FIG. 6B illustrates a pulse generator for use with the single pole single throw switch in FIG. 6A, the combination suitable for use in the sensor front end depicted in FIG. 1.

FIGS. 6A and 6B depict an embodiment of a single pole double throw (SPST) switch using FET switches and a suitable pulse generator to control the FET switches respectively. In particular, a SPDT switch 602 and an equivalent circuit using a pair of FET switches 600 is shown in FIG. 6A. A first FET 604 is normally connected to an input terminal 605 using a first voltage applied to the gate 608. A complimentary voltage is applied to the gate 610 of the second FET 606 to turn off the second FET and provide a normally open contact. As the voltages applied to the gates 612 and 614 are switched, the center terminal 605 is disconnected from the normally closed terminal and connected to the normally open terminal. For modest switching speeds, e.g., 10 nsec or more, properly configured TTL logic circuits may be used to provide the pulses used to switch the FET switches.

If faster pulses are required, a pulse generator 620 suitable for use with the FET switches is depicted in FIG. 6B. A step recovery diode (SRD) 642 is used that has a rapid transition time, i.e., it will rapidly switch from a conducting to a non-conducting state when a reverse bias is applied. As the drive signal from driver 624 falls, the SRD will switch off and the fast negative going pulse is provided to the capacitors 644 and 652 will differentiate the negative going pulse and provide an negative going impulse 654 at the first output 647, and a complimentary pulse at a second output 649.

Figure 7:
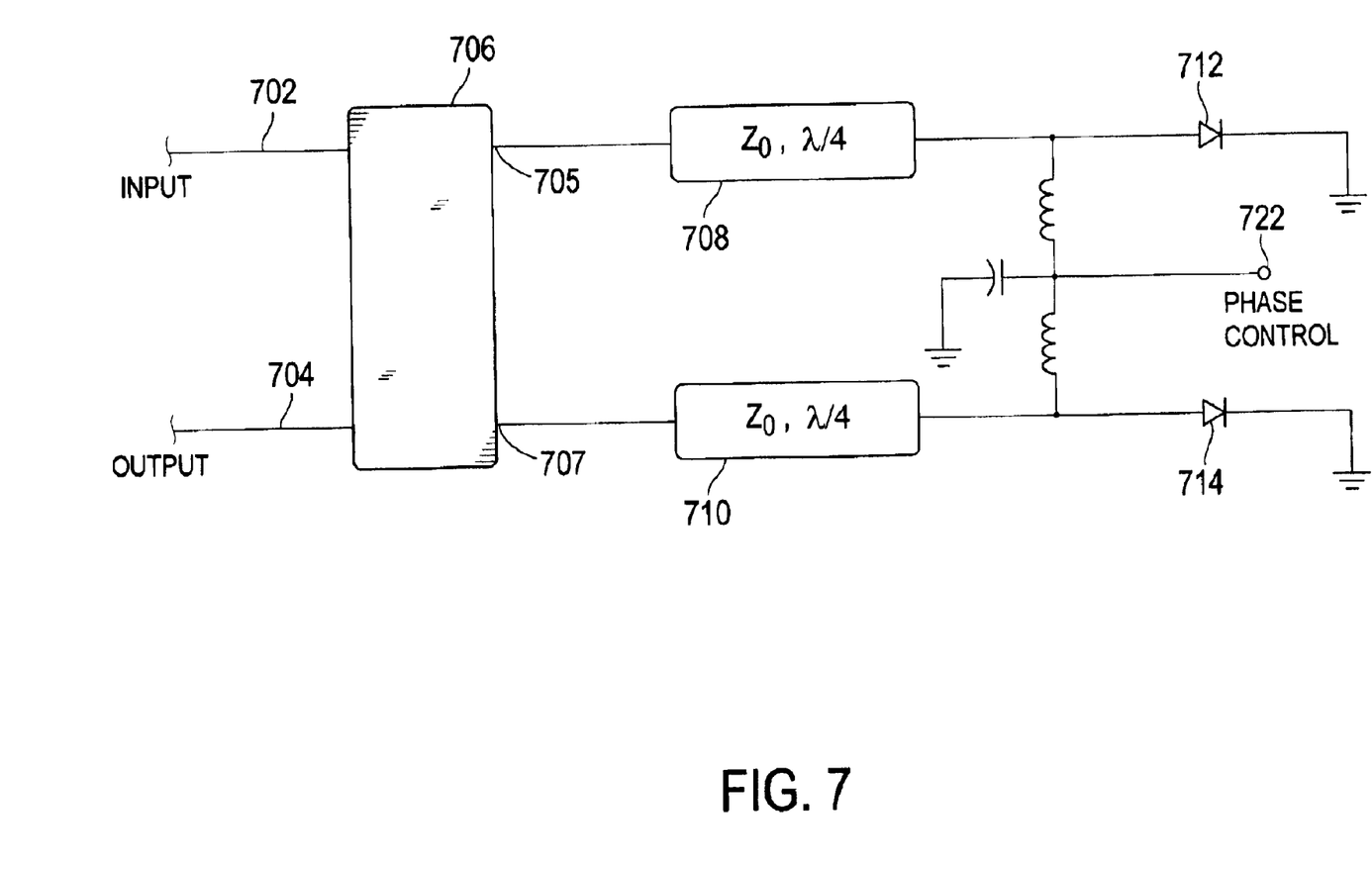
FIG. 7 illustrates one embodiment of a phase shifter suitable for use in the sensor front end depicted in FIG. 1.

FIG. 7 depicts one embodiment of a phase shifter 206 suitable for use with the sensor front end described herein. Phase shifter 206 includes a quadrature hybrid 706 that has four terminals, 702, 704, 705, and 707. Terminal 702 is arbitrarily set as the input terminal. Quadrature hybrids are devices that divide an input signal at one terminal into two signals that are output on the terminals on the opposite side of the hybrid. The two output signals typically have one-half the power of the input signal and are ninety degrees out of phase with one another. In the illustrated embodiment, a signal input at terminal 702 will be divided and phase shifted between terminals 705 and 707. If a signal is input at terminal 702 any reflections present at terminals 705 and 707 will be propagated through the hybrid and will be output at terminals 702 and 704. As such, the impedance and reflectivity of any transmission line or circuit elements coupled to the terminals 705 and 707 can cause reflections back into the quadrature hybrid 706 and provide a phase shifted version of the signal input at terminal 702 as an output at terminal 704. Transmission lines 708 and 710 are a quarter wavelength at the frequency of interest and will act as impedance transformers for the terminating impedances. The phase shift control signal is input to terminal 722 and will act to turn on or off the pin diodes 712 and 714. When on, the PIN diodes will short the terminal end of the quarter wavelength transmission lines 708 and 710 to ground resulting in a reflectivity of 1 and a nearly infinite impedance at the input to the two transmission lines. In the event that the PIN diodes 712 and 714 are turned off, the impedance of the PIN diodes 712 and 714 will be transformed by the quarter wavelength transmission lines 708 and 710 respectively.

Figure 8:
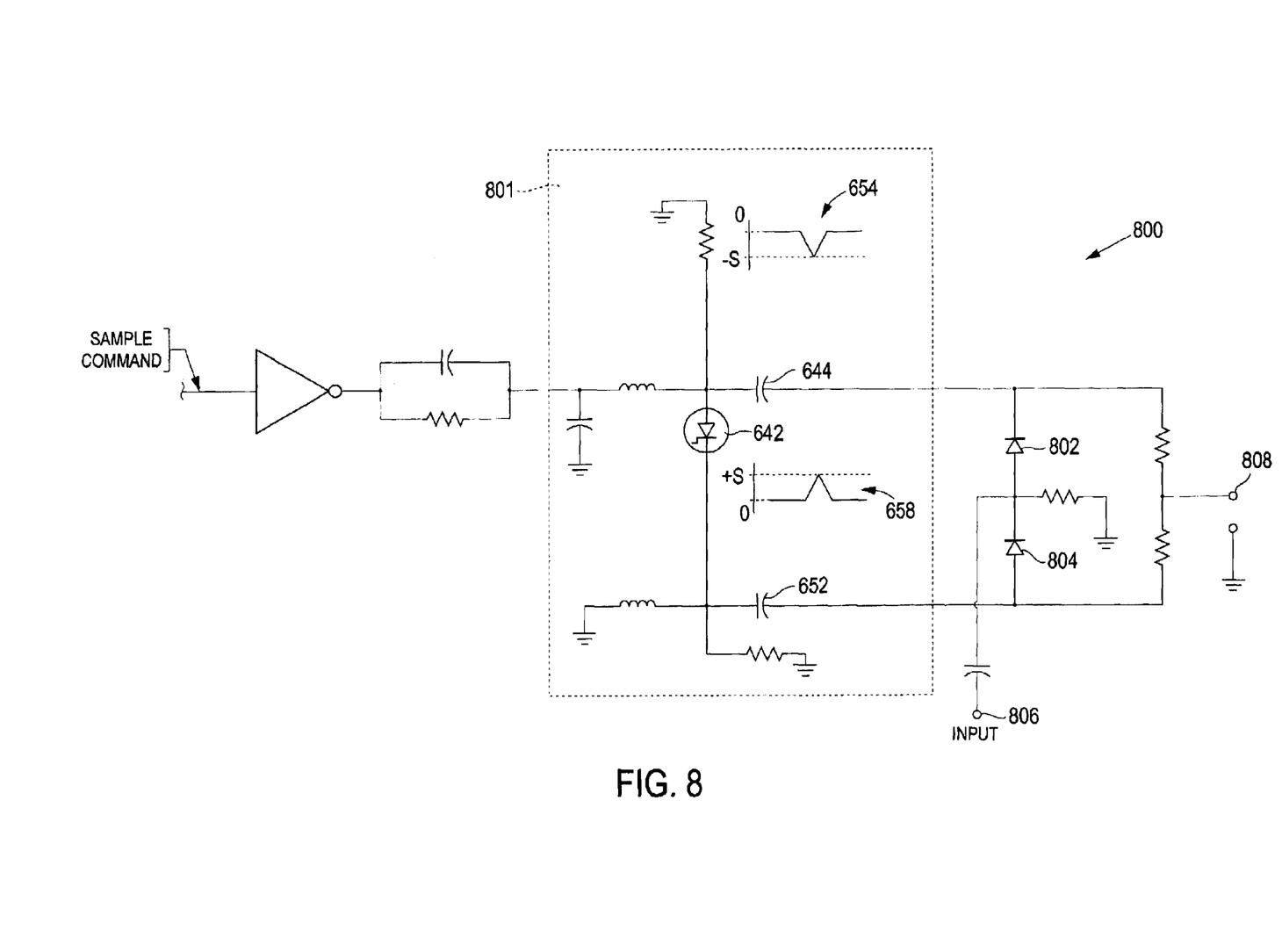
FIG. 8 is a sample module suitable for use with the sensor front end depicted in FIG. 1.

FIG. 8 depicts a sample module 800 that is suitable for use in the sensor front end depicted in FIG. 1. In particular the sample module 800 includes a front end 801 that provides short duration pulses. The front end 801 is described with respect to FIG. 6B. The differentiated pulses produced by the SRD 642 are applied to the diodes 802 and 804 forward biasing them. Forward biasing the diode 802 and 804 allows at least a portion of the signal current present at the sample input 806 to be provided to the capacitors 644 and 652 to provide a sample output 808.

Signal processing techniques known in the art may be added to increase the signal to noise ratio, to enhance object detection, or both. Non-coherent signal integration is utilized to reduce the noise fluctuations on the received signal. This is analogous to reducing the variance of a random variable around its mean. In one embodiment, a sample command can be issued at particular times during the reception of the reflected signal 123 so that particular range bins are sampled and observed. For any particular range bin, the time to the object can be determined by:

$$\tau_d = \frac{2 * R_d}{c}$$

where c is the speed of light, $R_d$ is the range bin "d" and $\tau_d$ is the time delay. If an I/Q mode is being used, then multiple I channel and multiple Q channel samples are taken during alternating pulse repetition frequency cycles and processed according to:

$$I_{av} = \sum_{k=1}^{n} I_k$$

$$Q_{av} = \sum_{k=1}^{n} Q_k, \text{ and}$$

$$E = \sum_{k=1}^{n} \sqrt{(I_{av}^2 + Q_{av}^2)}$$

where n is the total number of I and Q samples. If the resulting value E exceeds a predetermined threshold value, it may be determined that an object has been detected and is present in the range bin "d" Both in phase and quadrature phase signals should be used if possible, to ensure that stationary objects within the range bin are detected. It can be shown, that the signal to noise ratio can be improved as the square root of the number of samples taken.

Figure 9:
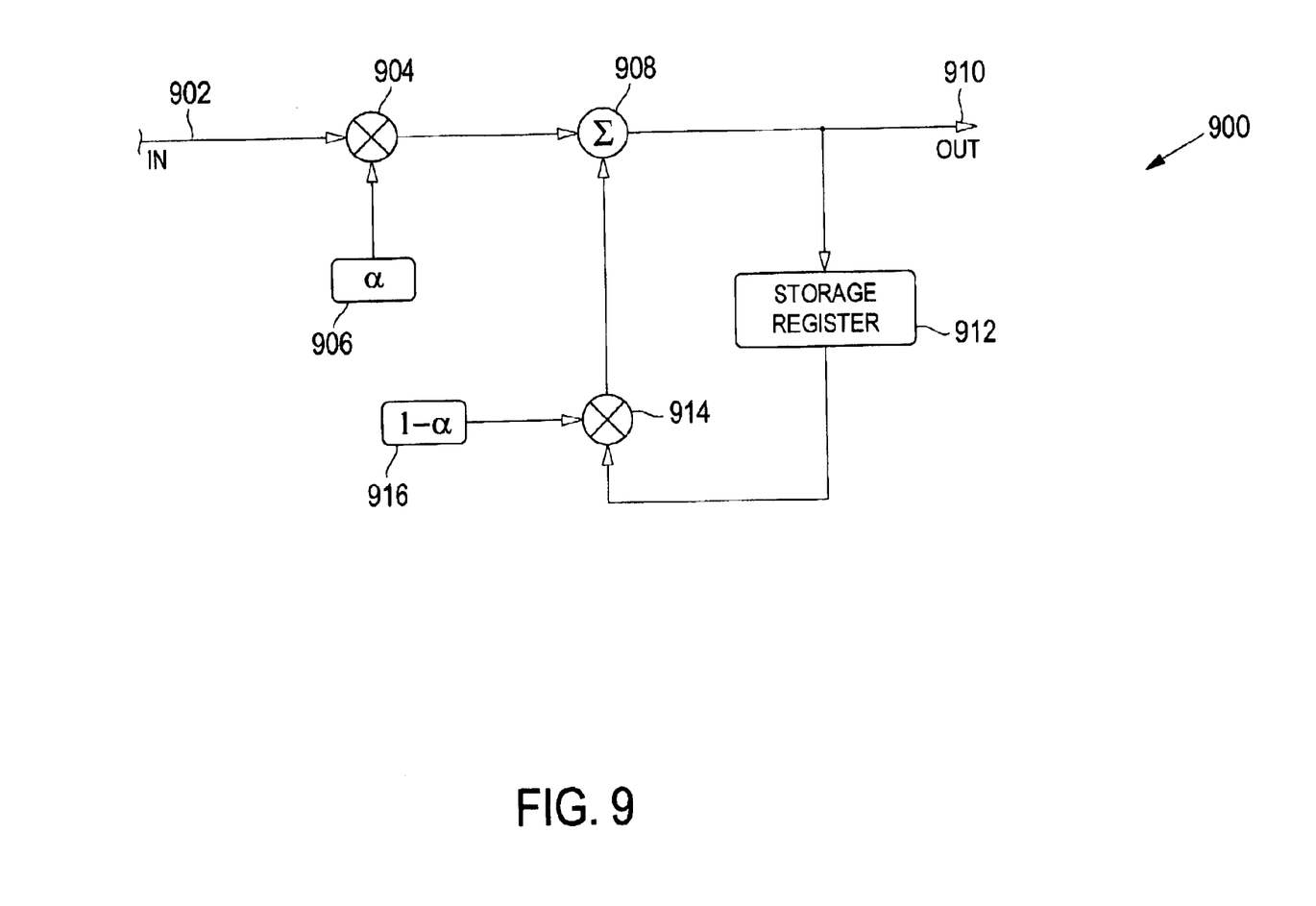
FIG. 9 is a block diagram of an exponential average module suitable for use in the sensor front end depicted in FIG. 1.

Other signal processing techniques known to those of skill in the art can be used as well. FIG. 9 is a block diagram of one embodiment of a signal processing technique that can be used on the sampled signals. In particular, the exponential averager 900 includes an input 902 coupled to a first multiplier 904. The first multiplier 904 multiplies the signal present on the input line 902 and a first constant 906. The resultant product is provided to the summing module 908 that adds the product from the first multiplier 904 with the product of a second multiplier 914. The second multiplier 914 multiplies a second constant 916, which preferably is the difference of one minus the first constant, and the resultant output 916 that has been stored in storage register 912. It can be shown that the reduction in noise power variance resulting from the exponential averaging is:

$$\frac{\sigma_{out}}{\sigma_{in}} = \frac{\alpha}{2 - \alpha}$$

where $\alpha$ is the value of the first coefficient and $\sigma$ is the noise power variance of the demodulated signal.

Advantageously, only a single storage register is used in the above implementation. Two separate exponential averagers have to be used when sampling both I and Q channels in an I/Q system. In the exponential averaging system depicted in FIG. 9, the weights of the first and second coefficients can be changed according to the system requirements. A smaller first coefficient and concomitantly larger second coefficient will attenuate the input samples and the past averaged outputs are then the dominant terms. If a larger first coefficient is used and concomitantly smaller second coefficients are used, the input samples will be the dominant terms in the equation and thus the system is able to respond more quickly to changes in the input data. The selection of the appropriate values of the first and second coefficients is determined by the particular system requirements.

As discussed above, the sensor signal pulses may be phase coded. If a sufficient number of pulses are included in the phase code sequence, the receiver is able to de-correlate interfering signals and improve the signal detection and signal to noise ratio of the receiver. In addition, the signal may be phase coded to reduce the degenerative impact of interference from other signal sources. In particular, as discussed above, the received signal is mixed with the first signal such that an output is provided only when both the received signal and the first signal are present. Phase coding the first signal and correlating the phase code of the received signal with the first signal can allow the sensor front end described herein to reject interfering signals and increase the reliability and security of the system.

Figure 10:
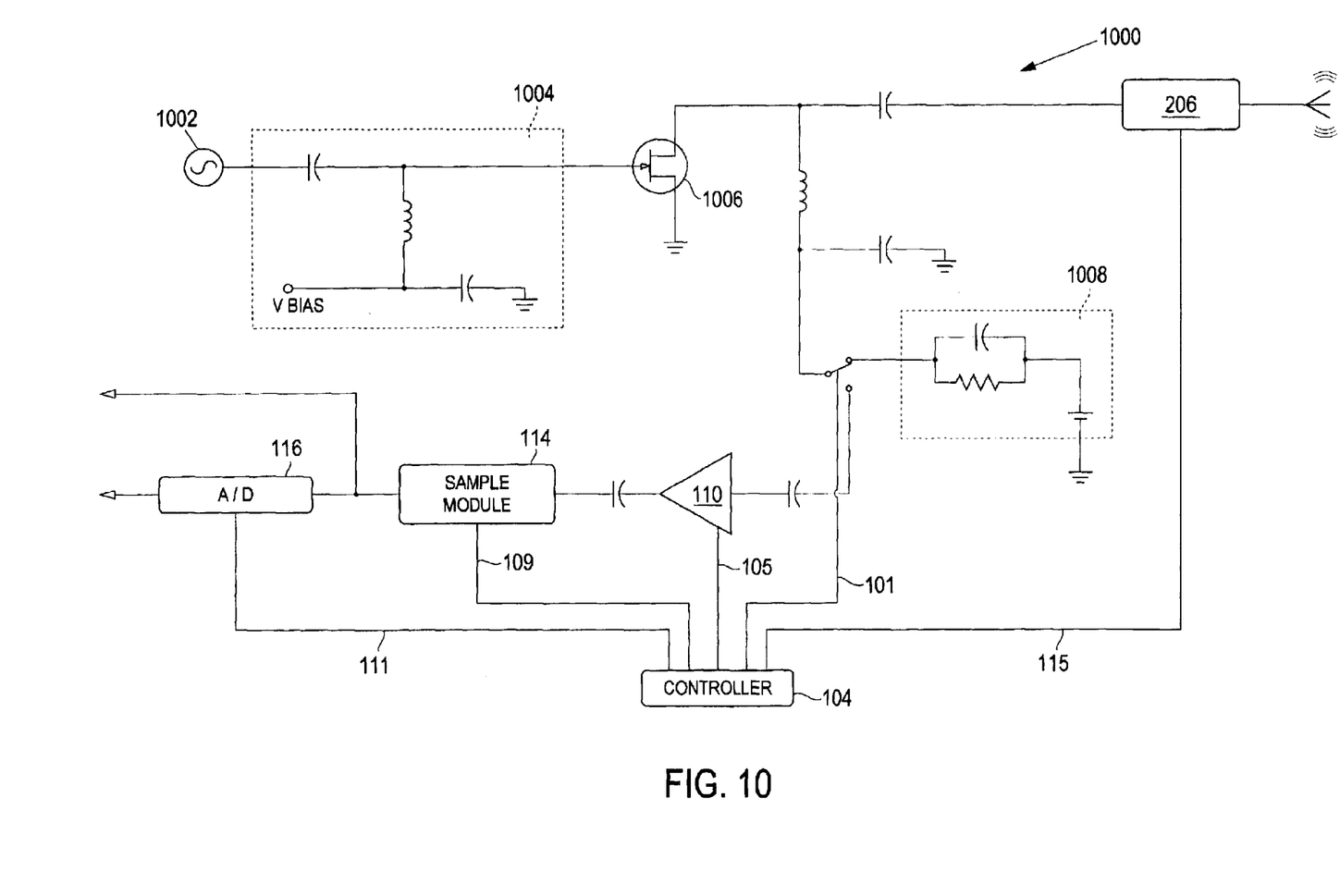
FIG. 10 is a block diagram of a another embodiment of a sensor front end consistent with the present invention.

FIG. 10 depicts another embodiment of a sensor front end 1000. In particular, the front end 1000 includes a CW signal source 1002 coupled to a FET 1006 that, along with its associated components 1004, operates as an amplifier while transmitting and as an unbiased mixer during receiving. This embodiment allows greater transmitter power to be used, however, as depicted in FIG. 10, phase coding is not possible without an additional component specifically added to implement a phase coding scheme. Except for the lack of phase-modulation and phase-demodulation, operation of the other components of the sensor front end 1000 are identical to the sensor front end 100 and the circuits described herein in FIGS. 4–9.

Those of ordinary skill in the art should further appreciate that variations to and modification of the above-described methods, apparatus for providing a phase coded sensor front end may be made without departing from the inventive concepts disclosed herein. Accordingly, the invention should be viewed as limited solely by the scope spirit of the appended claims.

What is claimed is:

1. A sensor front end, comprising:
   an antenna having an antenna port and a common aperture for transmitting a sensor signal and receiving a reflected signal;
   a tri-mode mixer having a first input/output port coupled to the antenna input, a second input/output port, and a first input port, wherein there is a predetermined amount of signal transmitted between the first input port and the first input/output port;
   a continuous wave signal source coupled to the first input port of the tri-mode mixer, the continuous wave signal source providing a first signal having a first frequency, a first amplitude and a first phase, wherein a portion of the first signal is transmitted between the first input port and the first input/output port and coupled to the antenna port and is transmitted therefrom as the sensor transmit signal, and wherein the tri-mode mixer receives the reflected signal from the antenna port and mixes the received reflected signal with the first signal and provides, as an output, a baseband video signal; and a receiver coupled to the second input/output port of the tri-mode mixer such that the baseband video signal provided by the tri-mode mixer is coupled to the receiver via the second output of the transmit-receive switch, the receiver being configured and arranged to provide as an output a sensor output signal.

2. The sensor front end of claim 1 further including:

a transmit-receive switch having an input coupled to the second input/output port of the mixer and first and second outputs;

a phase-modulator coupled to the first output of the transmit-receive switch, wherein when the transmit-receive switch is coupled to the first output, the phase-modulator provides phase-modulation to the tri-mode mixer that phase-modulates the first signal transmitted from the first input port to the first input/output port such that the transmitted sensor signal is phase-modulated; and wherein the receiver is coupled to the second output of the transmit-receive switch and the receiver includes a phase-demodulator configured and arranged to provide a phase-demodulation scheme that is complementary to the phase-modulation scheme provided by the phase-modulator.

3. The sensor front end of claim 1 further including a phase shifter inserted in series between the tri-mode mixer and the antenna port, wherein the phase shifter shifts both the sensor signal to be transmitted and the received reflected signal by a predetermined amount of phase shift.

4. The sensor front end of claim 3 wherein the predetermined amount of phase shift is forty-five degrees.

5. The sensor front end of claim 2 further including a controller coupled to the transmit-receive switch, the phase-modulator, and the phase-demodulator, wherein the controller is configured and arranged to switch the first switch between the first and second outputs at a predetermined pulse repetition rate, the controller further configured and arranged to provide a phase-modulation scheme and a complementary phase-demodulation scheme to the phase-modulator and demodulator respectively.

6. The sensor front end of claim 5 wherein the controller is coupled to the receiver and is configured and arranged to provide a sensitivity time control signal thereto.

7. The sensor front end of claim 1 further including a sampling module coupled to the output of the receiver and configured and arranged to receive the sensor output signal and to provide as an output a sampled sensor output signal.

8. The sensor front end of claim 7 further comprising an analog to digital converter coupled to the output of the sampling module and configured and arranged to receive the sampled sensor output signal and to provide as an output a digitized representation of the sampled sensor output signal.

9. The sensor front end of claim 1 wherein the tri-mode mixer is a double balanced mixer.

10. The sensor front end of claim 1 wherein the tri-mode mixer is a single balanced mixer.

11. The sensor front end of claim 2 wherein the transmit receive switch includes first and second electronic switch elements, each electronic switch element including first, second, and third terminals, the third terminal of the first electronic switch coupled to the first terminal of the second electronic switch element and the connection between the third and first terminals of the first and second electronic switch elements coupled to the second input/output port of the tri-mode mixer;

a symmetric pulse generator configured and arranged to provide first and second bipolar output pulses, the first output pulse being coupled to the second terminal of the first electronic switching element and the second output pulse being coupled to the second terminal of the second switching element;

wherein the first and second anti-symmetric pulses are used to turn on either the first or the second electronic switch element and couple the second input/output port of the tri-mode mixer to the first terminal of the first electronic switching element or to the third terminal of the second electronic switching element.

12. A sensor front end, comprising:

an antenna having an antenna port and a common aperture for transmitting a sensor signal and receiving a reflected signal;

a tri-mode mixer;

a continuous wave signal source coupled to the tri-mode mixer, the continuous wave signal source providing a first signal wherein a portion of the first signal is switched through the tri-mode mixer and coupled to the antenna port and is transmitted therefrom as the sensor signal, and wherein the tri-mode mixer receives the reflected signal from the antenna port and mixes the received reflected signal with the first signal and provides, as an output, a baseband video signal; and a receiver coupled to the tri-mode mixer such that the baseband video signal provided by the tri-mode mixer is coupled to the receiver, wherein the receiver being configured and arranged to provide a sensor output signal.

* * * * *